(12) United States Patent
Ebrahimi Afrouzi

(10) Patent No.: US 11,243,545 B1
(45) Date of Patent: Feb. 8, 2022

(54) SYSTEM AND METHOD FOR ESTABLISHING VIRTUAL BOUNDARIES FOR ROBOTIC DEVICES

(71) Applicant: Ali Ebrahimi Afrouzi, San Diego, CA (US)

(72) Inventor: Ali Ebrahimi Afrouzi, San Diego, CA (US)

(73) Assignee: AI Incorporated, Toronto (CA)

( * ) Notice: Subject to any disclaimer, the term of this patent is extended or adjusted under 35 U.S.C. 154(b) by 35 days.

(21) Appl. No.: 16/719,254

(22) Filed: Dec. 18, 2019

Related U.S. Application Data

(63) Continuation of application No. 14/850,219, filed on Sep. 10, 2015, now Pat. No. 10,545,504.

(60) Provisional application No. 62/141,799, filed on Apr. 1, 2015, provisional application No. 62/167,217, filed on May 27, 2015.

(51) Int. Cl.
*G05D 1/02* (2020.01)

(52) U.S. Cl.
CPC ... *G05D 1/0234* (2013.01); *G05D 2201/0215* (2013.01); *Y10S 901/01* (2013.01)

(58) Field of Classification Search
CPC .......... G05D 1/0234; G05D 2201/0215; Y10S 901/01
See application file for complete search history.

(56) References Cited

U.S. PATENT DOCUMENTS

| | | | |
|---|---|---|---|
| 2,072,962 A | 3/1937 | Plebanski | |
| 2,451,823 A | 10/1948 | Gustav | |
| 2,717,380 A | 9/1955 | Brooks | |
| 3,025,517 A | 3/1962 | Watson | |
| 5,353,224 A | 10/1994 | Lee | |
| 5,537,017 A | 7/1996 | Feiten | |
| 5,548,511 A | 8/1996 | Bancroft | |
| 5,634,237 A | 6/1997 | Paranjpe | |
| 6,389,329 B1 | 5/2002 | Colens | |
| 8,428,776 B2 | 4/2013 | Letsky | |
| 8,659,256 B2 | 2/2014 | Jones | |
| 9,919,425 B2 * | 3/2018 | Bushman | A47L 9/28 |
| 10,545,504 B2 * | 1/2020 | Ebrahimi Afrouzi | G05D 1/0234 |
| 10,579,066 B1 * | 3/2020 | Ebrahimi Afrouzi | B25J 9/1664 |
| 2004/0111184 A1 | 6/2004 | Chiappetta | |
| 2005/0251292 A1 | 11/2005 | Casey | |
| 2006/0259194 A1 | 11/2006 | Chiu | |
| 2008/0039974 A1 | 2/2008 | Sandin | |
| 2008/0059069 A1 * | 3/2008 | Trutna | G08G 1/166 701/301 |
| 2011/0040437 A1 | 2/2011 | Lynch | |

(Continued)

*Primary Examiner* — Donald J Wallace

(57) ABSTRACT

Methods for detecting an alignment of a robot with a virtual line, including: transmitting, with at least one transmitter of the robot, a first signal; receiving, with a first receiver and a second receiver of a device, the first signal; detecting, with the device, that the robot is aligned with the virtual line when the first receiver and the second receiver of the device simultaneously receive the first signal; transmitting, with at least one transmitter of the device, a second signal indicating that the robot is aligned with the virtual line; receiving, with at least one receiver of the robot, the second signal; actuating, with a processor of the robot, the robot to execute a movement upon receiving the second signal; and marking, with the processor of the robot, the location of the device in a map of an environment of the robot.

20 Claims, 10 Drawing Sheets

(56) References Cited

U.S. PATENT DOCUMENTS

| | | |
|---|---|---|
| 2014/0088761 A1 | 3/2014 | Shamilan |
| 2014/0320643 A1 | 10/2014 | Markendorf |
| 2016/0214258 A1 | 7/2016 | Yan |
| 2017/0001311 A1 | 1/2017 | Bushman |

* cited by examiner

SYSTEM AND METHOD FOR ESTABLISHING VIRTUAL BOUNDARIES FOR ROBOTIC DEVICES

CROSS-REFERENCE TO RELATED APPLICATIONS

This application is a Continuation of U.S. Non-Provisional patent application Ser. No. 14/850,219, filed Sep. 10, 2015, which claims the benefit of U.S. Provisional Patent Application Nos. 62/141,799, filed Apr. 1, 2015, and 62/167,217, filed May 27, 2015, each of which is hereby incorporated by reference.

FIELD OF THE DISCLOSURE

This disclosure relates to robotic systems generally, and more particularly to providing virtual boundaries for limiting surface coverage by robotic devices. This invention relates to confining the surface movement to defined areas of mobile robotic devices.

BACKGROUND

Robotic devices may operate within a confined portion of a physical area or workspace. Mobile robots may perform routine tasks, such as vacuuming, sweeping, mopping, cutting grass, etc., without moving into certain areas specified by the user. However, on occasion, a vacuuming robot operating within a first area may be permitted to travel into a second area prior to satisfactory completion of, for example, a vacuuming task within the first area. In other instances, the vacuuming robot may collide with and, potentially, damage a fragile or unstable object that is not detected by sensors accessed by the vacuuming robot. In other instances, a user may simply prefer that a vacuuming robot remain outside of an area, for example, if the area is currently in use. Thus, it may be useful to confine a robotic device so as to operate within certain areas and to prevent unwanted transition between areas.

One approach toward confining robotic device may be to utilize physical barriers that block the robotic device from entering, or becoming proximate with, one or more objects and/or areas of operation. However, this solution is neither efficient nor practical since substantial extra equipment (e.g., barriers and/or other objects) may encumber routine movement through the area of operation by the robotic device. Further, such an approach may involve an undesirable degree of human intervention, which may decrease a level of autonomy of the system as a whole.

Various systems have been proposed to confine and control robotic devices within subsections of workspaces. It can be advantageous to confine a robotic vacuum, for example, in a portion of a workspace so that it can adequately clean that space before moving on to another area. As such, systems and methods for establishing virtual boundaries for robotic devices are provided herein.

SUMMARY

Some embodiments include a method for detecting an alignment of a robot with a virtual line, including: transmitting, with at least one transmitter of the robot, a first signal; receiving, with a first receiver and a second receiver of a device, the first signal, wherein the device comprises a first passage and a second passage within which the first receiver and the second receiver are housed, respectively; detecting, with the device, that the robot is aligned with the virtual line when the first receiver and the second receiver of the device simultaneously receive the first signal, wherein the virtual line is in line with and located at a midpoint between the first passage and the second passage; transmitting, with at least one transmitter of the device, a second signal indicating that the robot is aligned with the virtual line; receiving, with at least one receiver of the robot, the second signal; actuating, with a processor of the robot, the robot to execute a movement upon receiving the second signal; and marking, with the processor of the robot, the location of the device in a map of the environment of the robot.

Some embodiments provide a system, including: a device for detecting alignment of a robot with a virtual line, including: at least one transmitter; a first passage and a second passage; and a first receiver and a second receiver positioned within the first passage and the second passage, respectively; wherein the device is configured to: receive a first signal with the first receiver and the second receiver; detect that the robot is aligned with the virtual line when the first receiver and the second receiver simultaneously receive the first signal, wherein the virtual line is in line with and located at a midpoint between the first passage and the second passage; and transmit a second signal indicating that the robot is aligned with the virtual line with the at least one transmitter; and the robot, including: at least one transmitter; at least one receiver; a processor; and a tangible, non-transitory, machine-readable medium for storing instructions that when executed by the processor effectuates operations including: transmitting, with the at least one transmitter, the first signal; receiving, with the at least one receiver, the second signal indicating that the robot is aligned with the virtual line; actuating, with the processor, the robot to execute a movement upon receiving the second signal; and marking, with the processor, a location of the device in a map of an environment of the robot.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF SOME EMBODIMENTS

Figure 1:
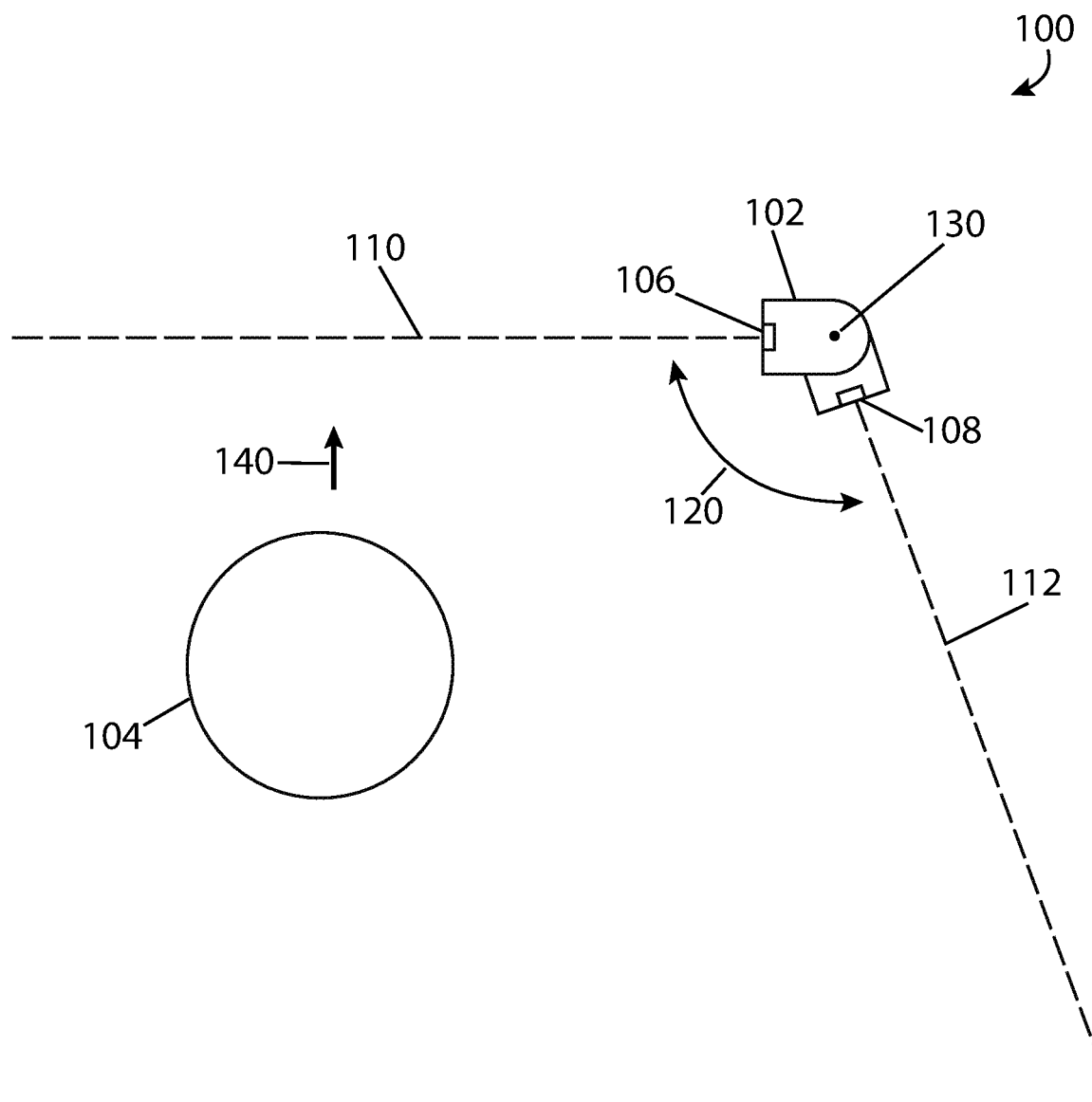
FIG. 1 illustrates an example of the operation of a virtual boundary system embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. The disclosure described herein is directed generally to one or more processor-automated methods and/or systems that generate one or more virtual barriers for restricting or permitting autonomous robotic device movement within or out of a working area.

As understood herein, the term "robot" or "robotic device" may be defined generally to include one or more autonomous devices having communication, mobility, and/or processing elements. For example, a robot or robotic device may comprise a casing or shell, a chassis including a set of wheels, a motor to drive wheels, a receiver that acquires signals transmitted from, for example, a transmitting beacon, a processor, and/or controller that processes and/or controls motor and other robotic autonomous or cleaning operations, network or wireless communications, power management, etc., and one or more clock or synchronizing devices.

Preferably one or more virtual boundary devices having one or more receivers, transmitters, or transceivers are provided to be portable and self-powered. In embodiments, a user may easily position a virtual boundary device in order to create a virtual boundary for the robotic device. The robotic device detects the position of the virtual boundary when it approaches it through communication between the robotic device and the virtual boundary device. Once the robotic device has detected its close proximity to the boundary it will alter its movement to avoid crossing the boundary.

FIG. 1 illustrates an example of the operation of virtual boundary system 100 embodying features of the present invention. Virtual boundary device 102 may be placed in a position where the user desires to restrict the movement of robotic device 104. Virtual boundary device 102 may have one or more paired receivers that establish virtual boundaries. As illustrated, two sets of paired receivers 106 and 108 are configured for providing virtual boundaries. As may be seen, receiver pair 106 establishes virtual boundary 110 and receiver pair 108 establishes a virtual boundary 112. Receiver pairs 106 and 108 may be either active devices which send and receive signals or passive devices which only receive signals in order to establish virtual boundaries. As illustrated, receiver pairs 106 and 108 may be pivotally coupled with virtual boundary device 102 such that a user may adjust the respective positions and angles of virtual boundaries 110 and 112 about pivot point 130.

As illustrated, robotic device 104 may, in the course of executing a coverage pattern for a work area, move in direction 140 toward virtual boundary 110. When robotic device 104 is positioned approximately along virtual boundary 110, receiver pair 106 may substantially simultaneously receive a signal emitted by robotic device 104 and virtual boundary device 102 may send a signal to robotic device 104 to take an appropriate action to avoid crossing boundary 110. In embodiments, the robotic device may alter its movement in any number of ways such as, stopping, slowing, and changing course without limitation. In embodiments, other appropriate actions may include triggering an algorithm or marking the present location as a boundary on a map without limitation. In further embodiments methods may allow robotic devices to pass a virtual boundary after a number of times of encountering the virtual boundary. In so doing, a work area may be completed before a robotic device moves across the virtual boundary to another work area. In other embodiments, methods may provide location information as a robotic device crosses a virtual boundary. For example, when a boundary system is placed at an entrance threshold, a robotic device crossing the virtual boundary provided may signal that the robotic device has entered a particular room and is now covering that room.

In some embodiments, receiver pairs 106 and 108 are passive devices which receive signals in order to establish a boundary. Receiver pairs 106 and 108 may each be comprised of two focused receivers that are able to receive a signal from robotic devices along substantially a single virtual boundary or plane which separates a desired robot work area from an area where the robotic device is prohibited. In an embodiment, receiver pairs 106 and 108 are each comprised of a pair of receivers positioned such that a signal may only be received at both receivers substantially simultaneously when the origin of the signal is substantially along the virtual boundary or plane.

The general method of operation of embodiments may now be disclosed. In embodiments, robotic devices may provide a continuous, semi-continuous, or pulsed robotic device signal as the robotic device moves about in its assigned work area. Each receiver pair may be monitored for detection of a robotic device signal. When both receivers of a receiver pair substantially simultaneously detect a robotic device signal, the robotic device emitting the robotic device signal will be positioned along a virtual boundary established by the receiver pair. A virtual boundary device will then send a boundary signal received by the robotic device. When the robotic device receives the boundary signal its movement is altered to avoid crossing the virtual boundary. In embodiments, the robotic device may alter its movement in any number of ways such as, stopping, slowing, and changing course without limitation. In embodiments, other appropriate actions may include triggering an algorithm or marking the present location as a boundary on a map without limitation. In further embodiments methods may allow robotic devices to pass a virtual boundary after a number of times of encountering the virtual boundary. In so doing, a work area may be completed before a robotic device moves across the virtual boundary to another work area. In other embodiments, methods may provide location information as a robotic device crosses a virtual boundary. For example, when a boundary system is placed at an entrance threshold, a robotic device crossing the virtual boundary provided may signal that the robotic device has entered a particular room and is now covering that room. In some embodiments, receiver pairs may be configured to receive robotic device signals constantly. In other embodiments receiver pairs may be configured to receive robotic device signals only on a desired schedule. In addition, in some embodiments, the robotic device signal may be configured to transmit only on a desired schedule. Furthermore, in embodiments, the boundary signal may be configured to transmit only on a desired schedule. In this manner, a robotic device may avoid a virtual boundary at designated times (such as during work hours) and ignore a virtual boundary at other times (such as during off hours).

Figure 2:
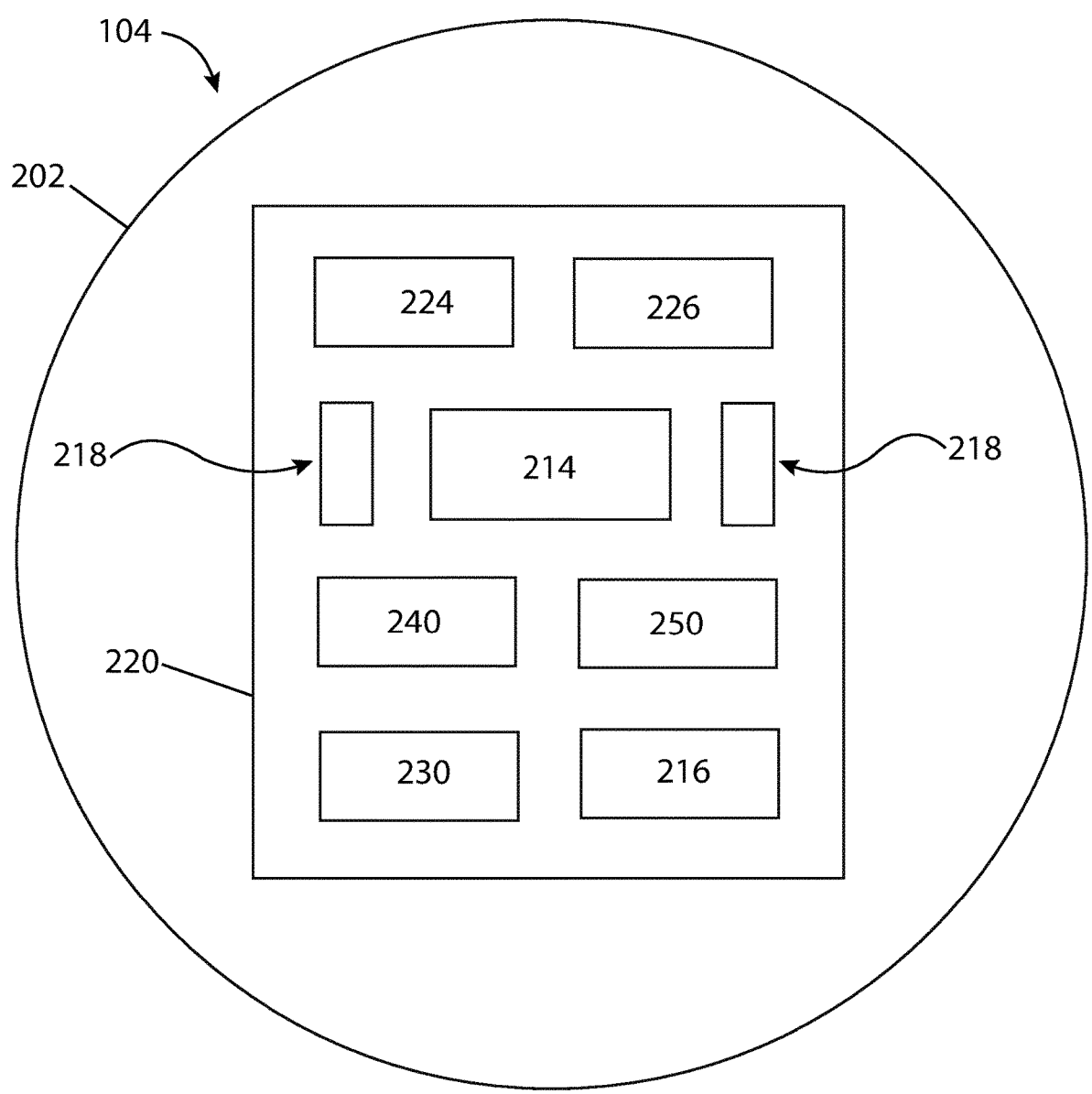
FIG. 2 illustrates a robotic device embodying features of the present invention.

FIG. 2 illustrates robotic device 104 embodying features of the present invention and/or having the type and functionality of a sample representative robotic device. As illustrated, robotic device 104 may include without limitation casing or shell 202, chassis 220, wheels 218, motor 214 for driving wheels 218, receiver 216 that detects transmitted signals, processor 224 and/or controller 226 to process and/or control motor and other robotic autonomous operations, network or wireless communications, power management, etc., and one or more clock or synchronizing devices 230. Device 104 may additionally include local digital memory or accessible storage unit 240 and wireless sonar/radio sensor and/or telecommunications transceiver 250 for mobile communication interface with a network or other wireless communication device, or boundary transceivers.

Figure 3:
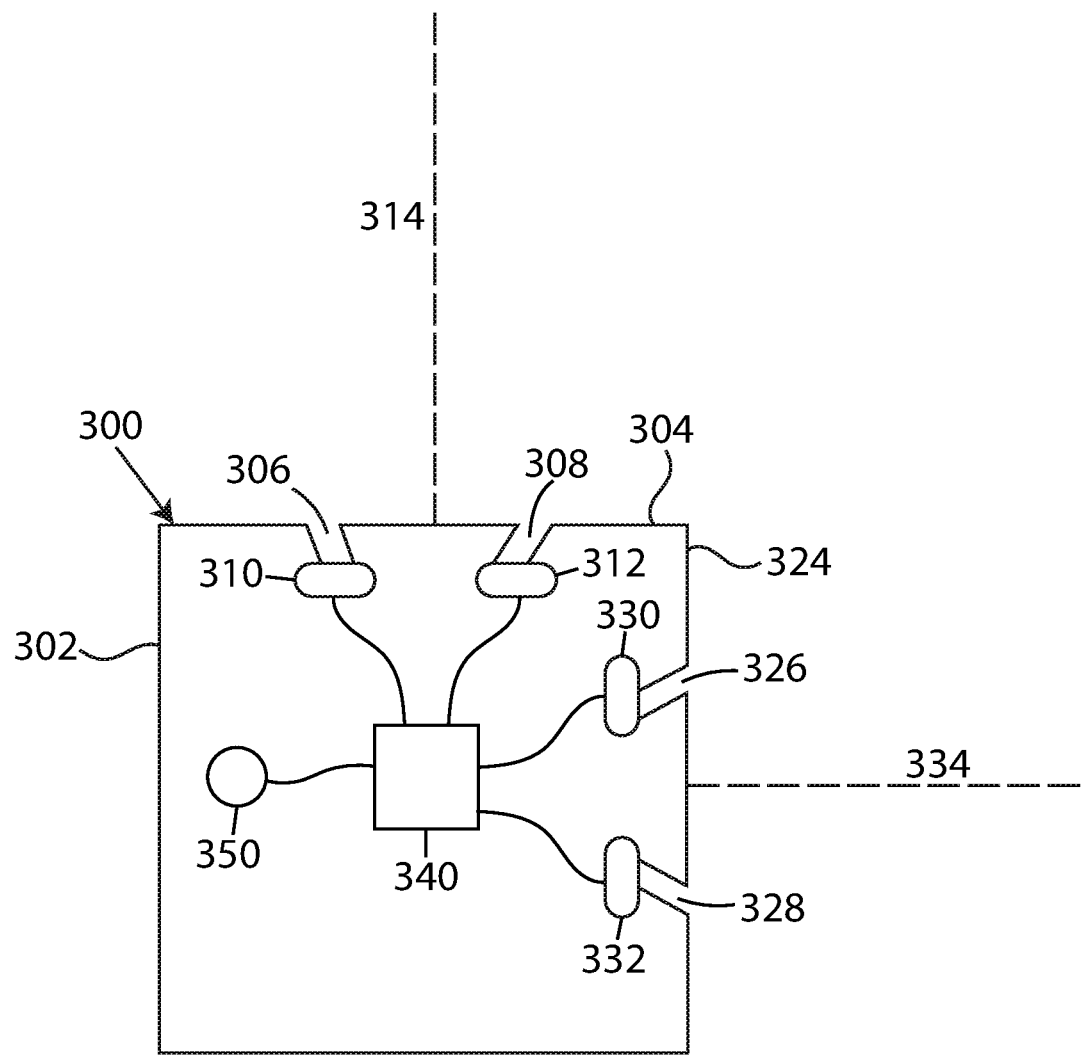
FIG. 3 illustrates a virtual boundary device embodying features of the present invention.

FIG. 3 illustrates virtual boundary device 300 embodying features of the present invention. As illustrated, virtual boundary device 300 may include housing 302. Within housing 302, receiver pair 310 and 312 are each located at the terminal end of each of passages 306 and 308 respectively. The combination of passages and receiver pair may be termed a virtual boundary component. Passages 306 and 308 extend from surface 304 to receiver pair 310 and 312 at an angle. The angle utilized prevents receiver pair 310 and 312 from substantially simultaneously receiving a signal unless the signal is emitted from a robotic device positioned along a line as illustrated by line 314. Thus, when a robotic device emitting a robotic device signal is positioned along virtual boundary 314, receiver pair 310 and 312 may substantially simultaneously receive a signal and thereby the robotic device may be caused to avoid the virtual boundary. In embodiments, the robotic device may avoid the virtual boundary by altering its movement in any number of ways such as, stopping, slowing, and changing course without limitation. In embodiments, other appropriate actions may include triggering an algorithm or marking the present location as a boundary on a map without limitation. In further embodiments methods may allow robotic devices to pass a virtual boundary after a number of times of encountering the virtual boundary. In so doing, a work area may be completed before a robotic device moves across the virtual boundary to another work area. In other embodiments, methods may provide location information as a robotic device crosses a virtual boundary. For example, when a boundary system is placed at an entrance threshold, a robotic device crossing the virtual boundary provided may signal that the robotic device has entered a particular room and is now covering that room. In embodiments, receiver pairs may be configured for receiving various signals such as, for example: infrared, laser, radio frequency, Wi-Fi, sonar, light, sound waves, global positioning signal, cellular communication device transmissions, magnetic field signal, or any other suitable wireless signal sent by a robotic device. In embodiments, the passages 306 are set at an angle with respect to a virtual boundary line. Passage angles may be in a range of approximately −90 to 90 degrees with respect to a virtual boundary line and preferably approximately −45 to 45 degrees with respect to a virtual boundary line. In addition, in embodiments, passage angles between sensors may be the same, may be inversely related, or may be different from each other without limitation.

In like manner, within housing 302, receiver pair 330 and 332 are each located at the terminal end of each of passages 326 and 328 respectively. Passages 326 and 328 extend from surface 324 to receiver pair 330 and 332 at an angle. The angle utilized prevents receiver pair 330 and 332 from substantially simultaneously receiving a signal unless the signal is emitted from a robotic device positioned along a line as illustrated by line 334. Thus, when a robotic device emitting a robotic device signal is positioned along virtual boundary 334, receiver pair 330 and 332 may substantially simultaneously receive a signal and thereby the robotic device may be caused to avoid the virtual boundary. In embodiments, receiver pairs may be configured for receiving various signals such as, for example: infrared, laser, radio frequency, Wi-Fi, sonar, light, sound waves, global positioning signal, cellular communication device transmissions, magnetic field signal, or any other suitable wireless signal sent by a robotic device. In embodiment, the passages 326 are set at an angle with respect to a boundary line 334.

Referring briefly to both FIGS. 2 and 3, in embodiments, passages 306 and 308 as well as receiver pair 310 and 312 may be positioned at substantially the same height as a transceiver 250 of robotic device 104 for improved reception of the signal from the robotic device. Likewise, in embodiments, passages 326 and 328 as well as receiver pair 330 and 332 may be positioned at substantially the same height as a transceiver 250 of robotic device 104 for improved reception of the signal from the robotic device.

Returning to FIG. 3, virtual boundary device 300 may include a controller 340 which may be electrically coupled with each of receiver 310, 312, 330, and 332. Further, transmitter 350 may be electrically coupled with controller 340. Transmitter 350 may be a transmitter for infrared, laser, radio frequency, Wi-Fi, sonar light, sound waves, global positioning signal, cellular communication device transmissions, magnetic field signal, or other suitable wireless transmitter which is compatible with a signal which may be received by the robotic device. Controller 340 may function to detect whether both receivers of any receiver pair substantially simultaneously receives an incoming signal. Any time a receiver pair substantially simultaneously receives an incoming signal, controller 340 enables transmitter 350 to transmit boundary signals, which may be received by a robotic device positioned along a virtual boundary and which may be programmed to alter its movement path upon receipt of the boundary signal. The controller 340 may be implemented with AND gate logic circuits. Other implementations may also be used, such as processor based controllers.

In embodiments, housings may be constructed of a type of material and a thickness which effectively blocks the robotic device signal. Alternatively, the circuit 340 may monitor the signal strength of the robotic device signal at each receiver and only enables the transmitter when the signal strength from both receivers exceeds a threshold amount which indicates that the robotic device signal is passing through both passages to the respective receivers.

Figure 4:
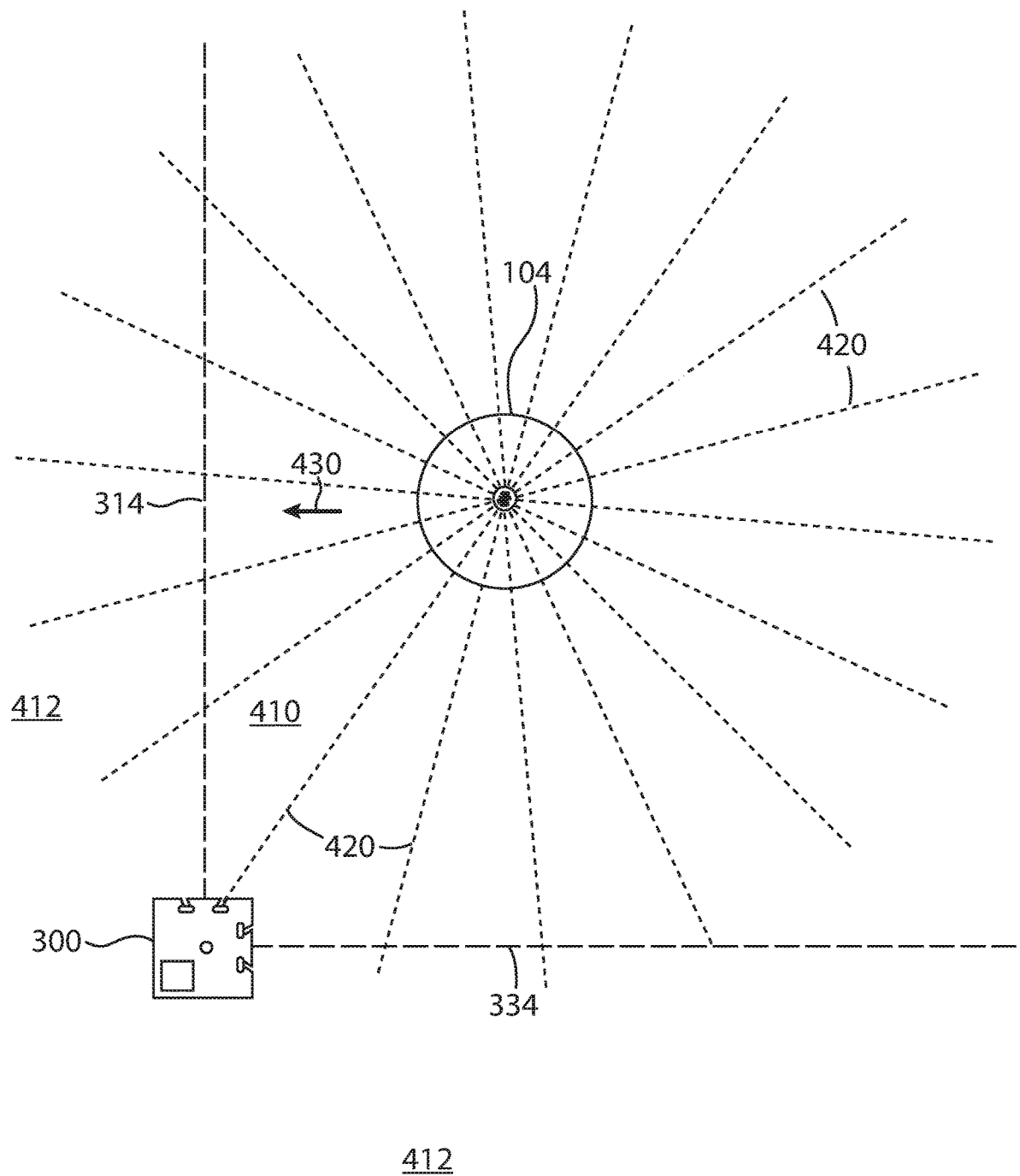
FIG. 4 illustrates the operation of a robotic device approaching a virtual boundary embodying features of the present invention.

FIG. 4 illustrates the operation of robotic device 104 approaching virtual boundary 314 embodying features of the present invention. The method will now be described. Virtual boundary device 300 may be positioned to establish virtual boundaries or planes 314 and 334. Virtual boundaries 314 and 334 apportion an area into a robotic device work area 410 and out of bounds area 412. In operation, robotic device 104 may be enabled to cover a surface area in a defined or random pattern. As such, robotic device 104 may move within the work area 410 co-located with virtual boundary 314. During movement, robotic device 104 may be configured to emit a continuous, semi-continuous, or pulsed robotic device signal 420 from its transceiver 250 (see FIG. 2). In embodiments, robotic device signals may include infrared, laser, radio frequency, Wi-Fi, sonar, light, sound waves, global positioning signal, cellular communication device transmissions, magnetic field signal, or other suitable wireless signal type.

Further, during movement robotic device 104 may travel along direction 430 toward virtual boundary 314. As shown in FIG. 4, the robotic device 104 is still located a distance from virtual boundary 314. At the position illustrated, robotic device signal 420 is only being received by one receiver of a receiver pair associated with boundary 314. As such, a controller in virtual boundary device 300 detects that only one of receiver pair is receiving robotic device signal 420 and does not enable transmission of a boundary signal.

Figure 5:
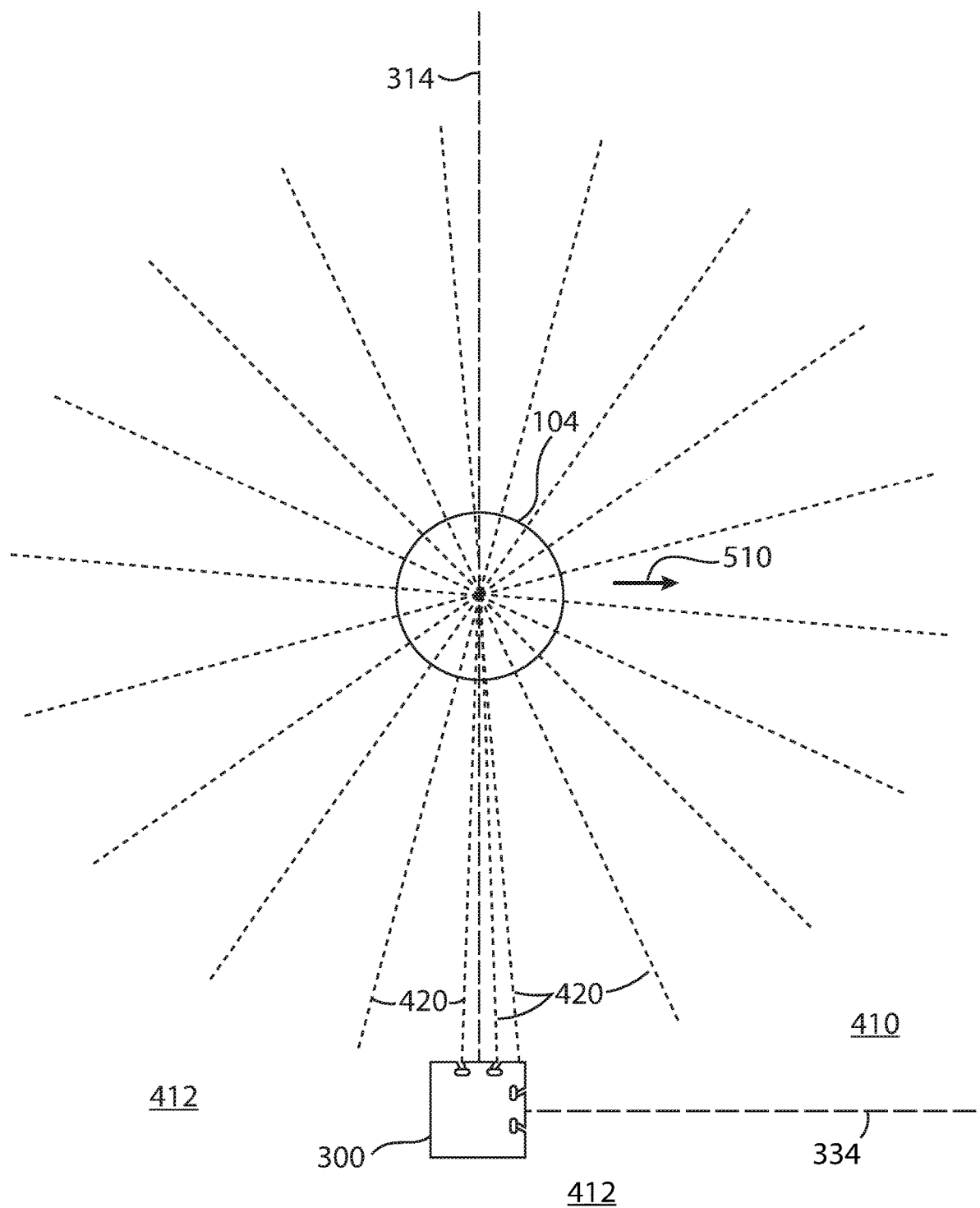
FIG. 5 illustrates the operation of a robotic device intersecting a virtual boundary embodying features of the present invention.

FIG. 5 illustrates the operation of robotic device 104 intersecting virtual boundary 314 embodying features of the present invention. Once robotic device 104 is located at virtual boundary 314, robotic device signal 420 is substantially simultaneously received by a receiver pair of virtual boundary device 300. A controller detects a receiver pair is receiving robotic device signal 420. The controller then enables a transmitter to send an outbound signal to robotic device 104. Robotic device 104 receives the boundary signal and its controller instructs the robotic device 104 to alter its movement to avoid crossing virtual boundary 314. As an illustrated example, robotic device 104 may reverse its path and proceed in direction 510. As robotic device 104 moves away from virtual boundary 314, both receivers of a receiver pair are no longer substantially simultaneously receiving robotic device signal 420. The virtual boundary device controller detects the lack of a signal at the receiver pair and the virtual boundary device controller then terminates the boundary signal. Thus, the robotic device is prevented from crossing the virtual boundary 314 and equally prevented from covering out of bounds area 412.

Figure 6:
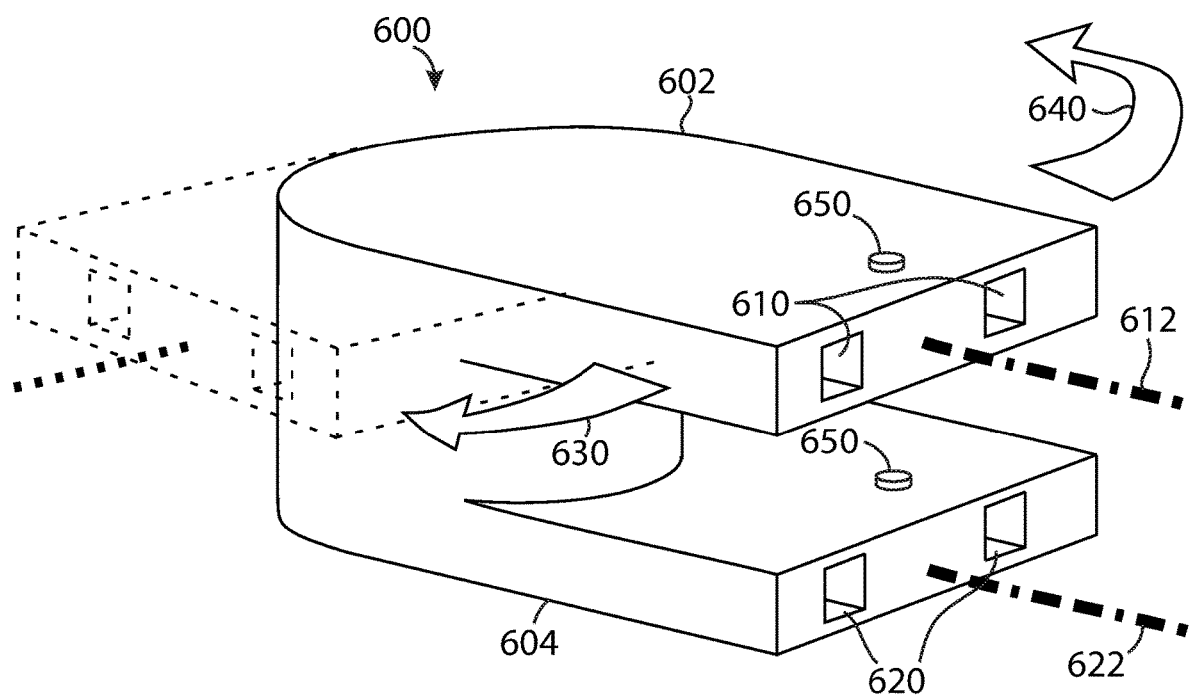
FIG. 6 illustrates an embodiment of a virtual boundary device embodying features of the present invention.

FIG. 6 illustrates an embodiment of virtual boundary device embodying features of the present invention. As illustrated, virtual boundary device 600 is rotatably adjustable. Further illustrated, upper portion 602 is rotatably coupled with lower portion 604. Upper portion 602 has a pair of passages 610 and each passage terminates at a receiver (not shown). The receivers of passages 610 are a receiver pair. Passages 610 and corresponding receiver pair are configured similar to the embodiments described above such that they define a virtual boundary 612. Lower portion 604 also has passages 620 and each passage 620 terminates at a receiver (not shown). Passages 620 and corresponding receiver pair are configured to define virtual boundary 622. Virtual boundary device 600 may also include a controller and transmitter similar to those previously described above.

In operation, a user may rotate upper portion 602 in direction 630 or 640 relative to bottom portion 604. In this manner, virtual boundary 612 may be adjusted relative to virtual boundary 622. This configuration allows users to customize the angle between virtual boundaries to fit the particular needs of a working environment. In some embodiments, virtual boundaries may be activated and deactivated through a switch or button 650 that activates and deactivates the corresponding receiver pairs. Switch 650 may control a switch located between the power source and the receiver set.

Figure 7:
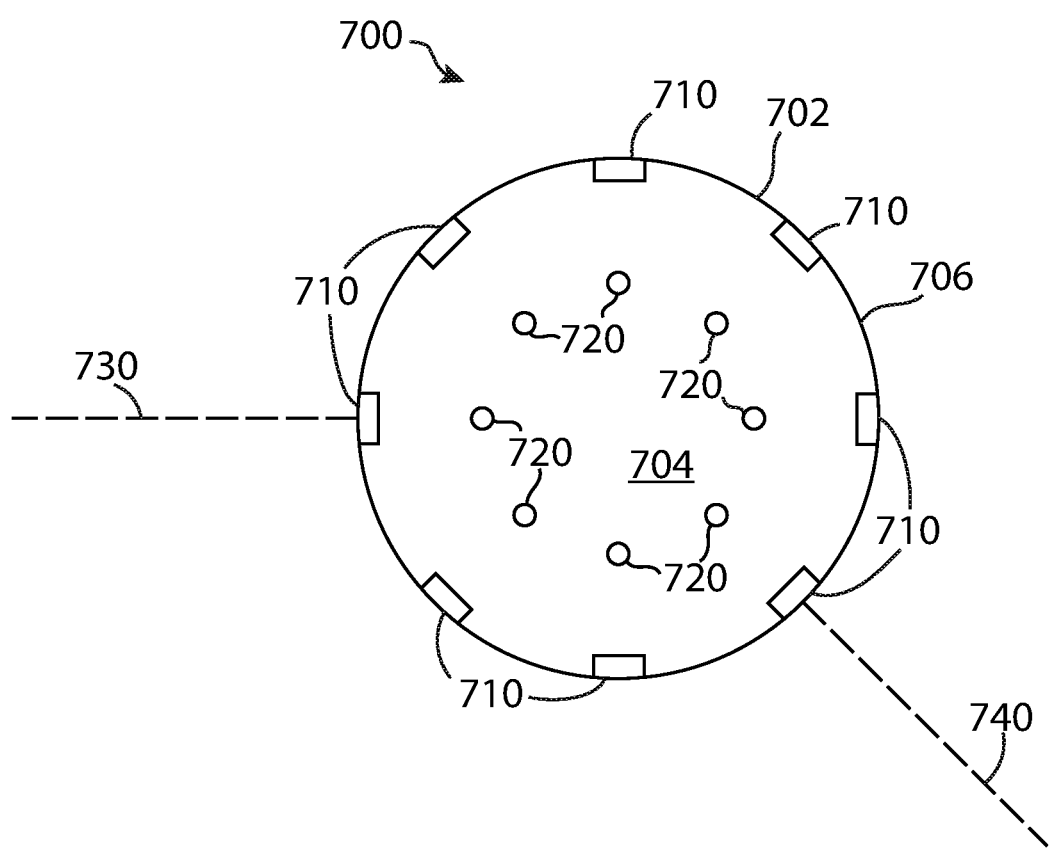
FIG. 7 illustrates an embodiment of a virtual boundary device embodying features of the present invention.

FIG. 7 illustrates an embodiment of virtual boundary device 700 embodying features of the present invention. As illustrated, virtual boundary device 700 includes cylindrically shaped housing 702. Housing 702 includes top surface 704 and side surface 706. Side surface 706 includes a number of virtual boundary components 710 positioned along the circumference of housing 702. Each virtual boundary component includes a pair of passages and receivers similar to those described above. A plurality of buttons 720 may be positioned along top surface 704. Each button may be associated with one of the virtual boundary components 710. The button may control a switch located between a power source and the receivers located within the respective virtual boundary component 710. A user may selectively enable different virtual boundary components to configure the appropriate virtual boundaries for the robotic device. FIG. 7 illustrates an example where two of the virtual boundary components are enabled, thereby defining two virtual boundaries 730 and 740. Other configurations are possible by enabling or disabling selected setters 720 as desired.

The number and positioning of sets of receivers may vary and is not limited. The designs shown are for illustration purposes only and are not meant to be restrictive. Various types of wireless signals, such as infrared light, laser, radio frequencies, Wi-Fi signals, sonar signals, light, sound waves, global positioning signal, cellular communication device transmissions, magnetic field signal, or any other available wireless signal may be used for sending signals from the robotic device to the transceiver and for sending signals from the transceiver's emitter to the robotic device.

Figure 8:
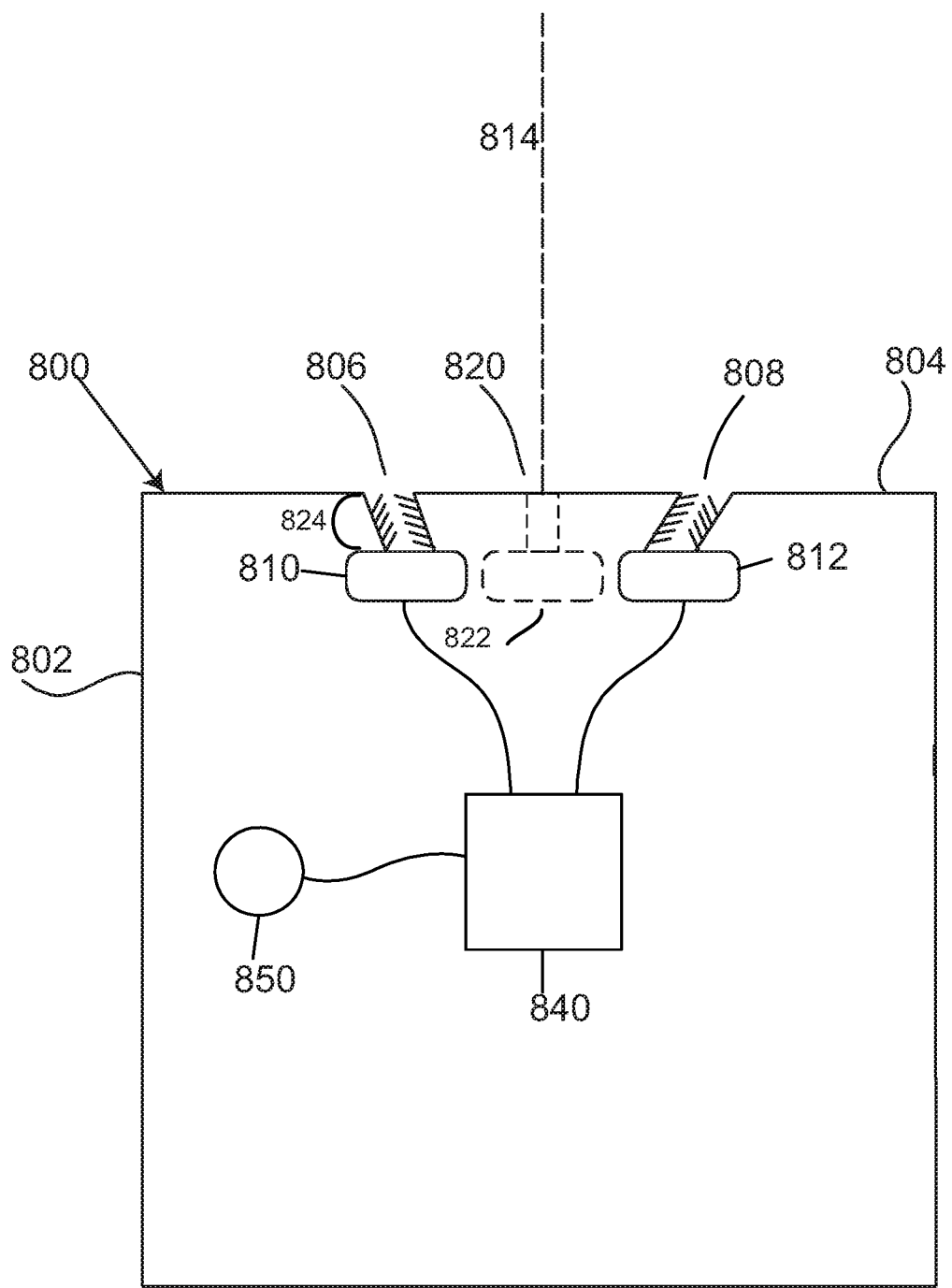
FIG. 8 illustrates a virtual boundary device embodying features of the present invention.

FIG. 8 illustrates a virtual boundary device embodying features of the present invention. As illustrated, virtual boundary device 800 may include housing 802. Within housing 802, receiver pair 810 and 812 are each located at the terminal end of each of passages 806 and 808 respectively. The combination of passages and receiver pair may be termed a virtual boundary component. Passages 806 and 808 extend from surface 804 to receiver pair 810 and 812 at an angle. The angle utilized prevents receiver pair 810 and 812 from substantially simultaneously receiving a signal unless the signal is emitted from a robotic device positioned along a line as illustrated by line 814. Thus, when a robotic device emitting a robotic device signal is positioned along virtual boundary 814, receiver pair 810 and 812 may substantially simultaneously receive a signal and thereby the robotic device may be caused to avoid the virtual boundary.

Further illustrated are a number of baffles 824 positioned along the walls of passage 806. Baffles may be utilized to further narrow the reception range of receiver pair 810 and 812 and reduce reception of reflected signals being transmitted toward receiver pair 810 and 812. Baffles may be angled toward opening of passages. In embodiments, baffles may be manufactured from signal absorbing materials or signal reflective materials without limitation. In further embodiments, baffles may be angled at a range of approximately 10 to 60 degrees, more preferably 40 degrees. As may be appreciated, different angles may impart different signal reception characteristics.

In embodiments, the robotic device may avoid the virtual boundary by altering its movement in any number of ways such as, stopping, slowing, and changing course without limitation. In embodiments, other appropriate actions may include triggering an algorithm or marking the present location as a boundary on a map without limitation. In further embodiments methods may allow robotic devices to pass a virtual boundary after a number of times of encountering the virtual boundary. In so doing, a work area may be completed before a robotic device moves across the virtual boundary to another work area. In other embodiments, methods may provide location information as a robotic device crosses a virtual boundary. For example, when a boundary system is placed at an entrance threshold, a robotic device crossing the virtual boundary provided may signal that the robotic device has entered a particular room and is now covering that room. In embodiments, receiver pairs may be configured for receiving various signals such as, for example: infrared, laser, radio frequency, Wi-Fi, sonar, light, sound waves, global positioning signal, cellular communication device transmissions, magnetic field signal, or any other suitable wireless signal sent by a robotic device. In embodiment, the passages 806 are set at an angle with respect to a virtual boundary line. Passage angles may be in a range of approximately −90 to 90 degrees with respect to a virtual boundary line, and preferably approximately −45 to 45 degrees with respect to a virtual boundary line. In addition, in embodiments, passage angles between sensors may be the same, may be inversely related, or may be different from each other without limitation.

Further illustrated is passage 820 and receiver 822. As illustrated, passage 820 may be positioned between passage 806 and passage 808. Unlike passages 806 and 808, passage 820 is not angled. Rather passage 820, in embodiments, may be substantially parallel with respect to virtual boundary 814. In embodiments, an additional receiver may provide addition control inputs. For example, in an embodiment, when a signal is received at receivers 810 and 822, an instruction may be transmitted to a robotic device as, for example, "slow" or "begin turn." Likewise, when a signal is received at receivers 810 and 822 a further instruction may be transmitted to a robotic device. In this manner, a robotic device may be more finely tuned to operate within a virtual boundary.

Returning to FIG. 8, virtual boundary device 800 may include a controller 840 which may be electrically coupled with each of receiver 810, 812, and 822. Further, transmitter 850 may be electrically coupled with controller 840. Transmitter 850 may be a transmitter for infrared, laser, radio frequency, Wi-Fi, sonar, light, sound waves, global positioning signal, cellular communication device transmissions, magnetic field signal, or other suitable wireless transmitter which is compatible with a signal which may be received by the robotic device. Controller 840 may function to detect whether both receivers of any receiver pair substantially simultaneously receives an incoming signal. Any time a receiver pair substantially simultaneously receives an incoming signal, controller 840 enables transmitter 850 to transmit boundary signals, which may be received by a robotic device positioned along a virtual boundary and which may be programmed to alter its movement path upon receipt of the boundary signal. The controller 840 may be implemented with AND gate logic circuits. Other implementations may also be used, such as processor based controllers.

In embodiments, housings may be constructed of a type of material and a thickness which effectively blocks the robotic device signal. Alternatively, the circuit 840 may monitor the signal strength of the robotic device signal at each receiver and only enables the transmitter when the signal strength from both receivers exceeds a threshold amount which indicates that the robotic device signal is passing through both passages to the respective receivers.

It may be appreciated that robotic device embodiments disclosed herein may be autonomous, semi-autonomous, or remote controlled. That is, robotic device embodiments are not limited in response to virtual boundary systems provided herein. For example, a robotic device may, upon reaching a steep turn, engage a semi-autonomous vehicle on a track to navigate the steep turn. It may be further appreciated that many types of coordination with systems provided herein may be contemplated.

Figure 9:
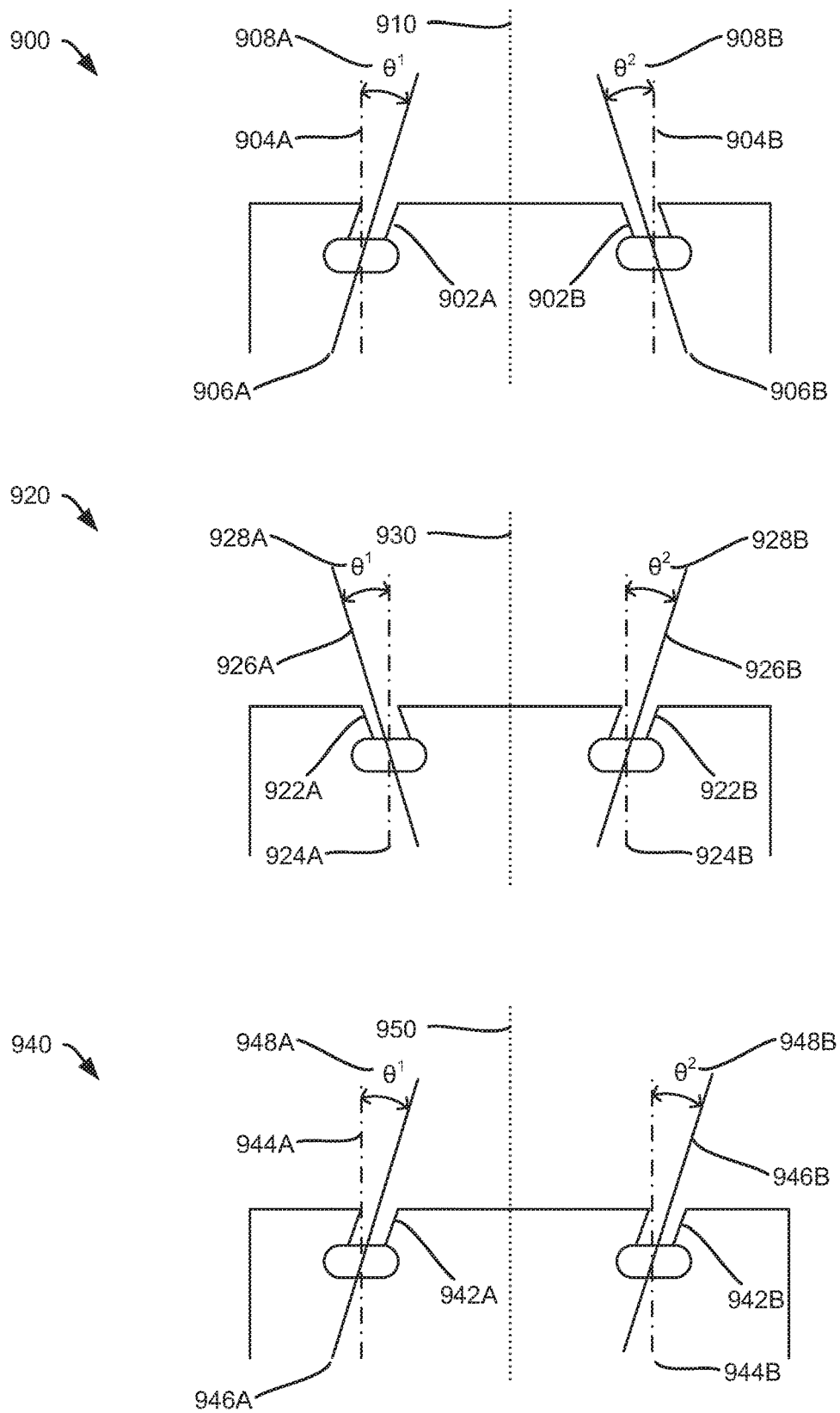
FIG. 9 illustrates virtual boundary devices embodying features of the present invention.

FIG. 9 illustrates virtual boundary devices embodying features of the present invention. As noted above, in embodiments passages may be at various angles with respect to a virtual boundary line. In embodiments, passage angles may be in a range of approximately −90 to 90 degrees with respect to a virtual boundary line and preferably approximately −45 to 45 degrees with respect to a virtual boundary line. In addition, in embodiments, passage angles between sensors may be the same, may be inversely related, or may be different from each other without limitation. Various passage configurations are illustrated in FIG. 9. For example, virtual boundary device 900 may include a pair of passages 902A and 902B, which passages may be inwardly facing with respect to virtual boundary line 910. Lines 904A and 904B are parallel with virtual boundary line 910 and are provided for reference. As illustrated, passage 902A is angled at $\theta^1$ 908A and may received signals along line 906A. Likewise, passage 902B is angled at $\theta^2$ 908B and may received signals along line 906B. In another embodiment, virtual boundary device 920 may include a pair of passages 922A and 922B, which passages may be outwardly facing with respect to virtual boundary line 930. Lines 924A and 924B are parallel with virtual boundary line 930 and are provided for reference. As illustrated, passage 922A is angled at $\theta^1$ 928A and may received signals along line 926A. Likewise, passage 922B is angled at $\theta^2$ 928B and may received signals along line 926B. In a further embodiment, virtual boundary device 940 may include a pair of passages 942A and 942B, which passages may be rightward facing with respect to virtual boundary line 950. Lines 944A and 944B are parallel with virtual boundary line 950 and are provided for reference. As illustrated, passage 942A is angled at $\theta^1$ 948A and may received signals along line 946A. Likewise, passage 942B is angled at $\theta^2$ 948B and may received signals along line 946B. It may be seen from the foregoing examples that passages may be configured at any angle without departing from embodiments provided herein. In addition, angles between passages may be the same or different without limitation in embodiments.

Figure 10:
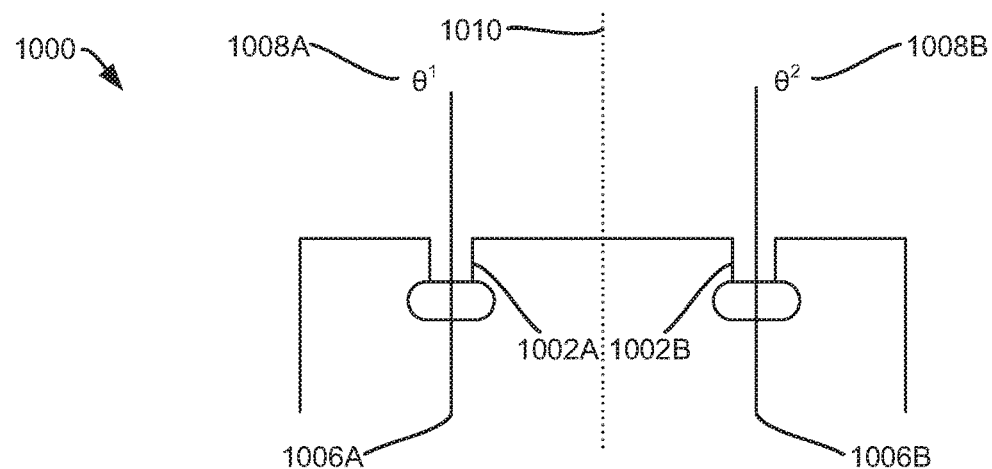
FIG. 10 illustrates a virtual boundary device embodying features of the present invention.

FIG. 10 illustrates a virtual boundary device embodying features of the present invention. As illustrated, virtual boundary device 1000 may include a pair of passages 1002A and 1002B, which passages may be forward facing with respect to virtual boundary line 1010. As illustrated, passage 1002A has an angle $\theta^1$ 1008A of approximately zero with respect to virtual boundary line 1010. That is, passage 1002A is substantially parallel with virtual boundary line 1010. Further, passage 1002A may receive signals along line 1006A. Further illustrated, passage 1002B has an angle $\theta^2$ 1008B of approximately zero with respect to virtual boundary line 1010. That is, passage 1002B is substantially parallel with virtual boundary line 1010. Further, passage 1002B may receive signals along line 1006B. It may be seen from the foregoing examples that passages may be configured at any angle without departing from embodiments provided herein. In addition, angles between passages may be the same or different without limitation in embodiments.

ALTERNATE EMBODIMENTS

Figure 11:
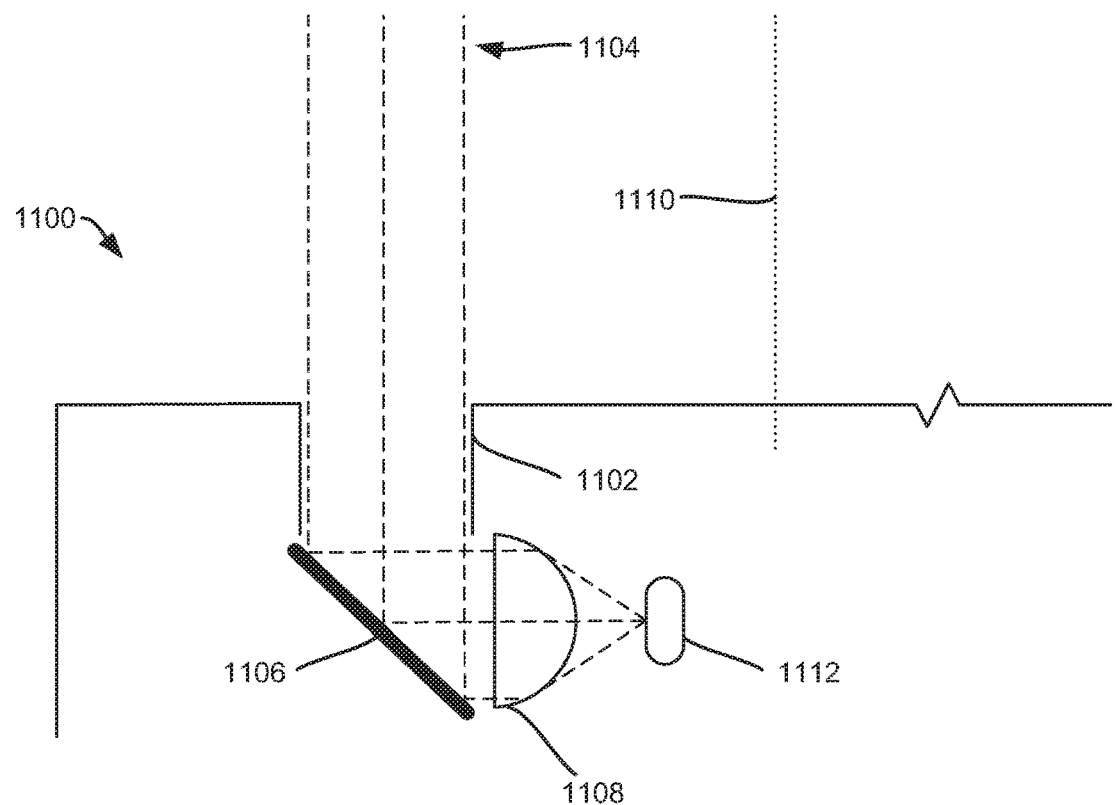
FIG. 11 illustrates a virtual boundary device embodying features of the present invention.

FIG. 11 illustrates a virtual boundary device embodying features of the present invention. In particular, FIG. 11 is an illustrative representation of a passage embodiment using additional optical configurations. As illustrated, virtual boundary device 1100 may include passage 1102 that, unlike previous embodiments, terminates in reflective element 1106. As illustrated, passage 1012 is substantially parallel with virtual boundary line 1110. In embodiments, reflective element 1106 may be utilized to reflect received signals 1104 toward sensor 1112. Reflective element embodiments may be matched to reflect a particular signal or range of signals as desired. In addition, virtual boundary device 1100 may further include focusing element 1108 for focusing signal 1104 toward sensor 1112. Any type of suitable focusing element known in the art may be utilized without departing from embodiments contemplated herein. As above passages utilizing optical configurations may be at various angles with respect to a virtual boundary line without limitation and without departing from embodiments provided herein.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

The invention claimed is:

1. A method for detecting an alignment of a robot with a virtual line, comprising:
transmitting, with at least one transmitter of the robot, a first signal;
receiving, with a first receiver and a second receiver of a device, the first signal, wherein the device comprises a first passage and a second passage within which the first receiver and the second receiver are housed, respectively;
detecting, with the device, that the robot is aligned with the virtual line when the first receiver and the second receiver of the device simultaneously receive the first signal, wherein the virtual line is in line with and located at a midpoint between the first passage and the second passage;
transmitting, with at least one transmitter of the device, a second signal indicating that the robot is aligned with the virtual line;
receiving, with at least one receiver of the robot, the second signal; and
actuating, with a processor of the robot, the robot to execute a movement upon receiving the second signal.

2. The method of claim 1, further comprising:
determining, with the processor of the robot, a location of the robot based on a signal received by a transmitter of the robot from a receiver of the device.

3. The method of claim 1, wherein the movement comprises at least one of:
reversing, moving forward, and turning.

4. The method of claim 1, further comprising:
actuating, with the processor of the robot, the robot to slow down upon receiving the second signal.

5. The method of claim 1, wherein the first receiver and the second receiver are configured to only receive the first signal during a designated time.

6. The method of claim 1, wherein the first signal is only transmitted during a designated time.

7. The method of claim 1, wherein the device is at least one of: self-powered and portable.

8. The method of claim 1, wherein the first passage and the second passage include a plurality of baffles positioned along their respective passage walls.

9. The method of claim 8, wherein the plurality of baffles of the first passage and the second passage are angled towards an opening of the respective passage.

10. The method of claim 1, wherein the first passage and the second passage are oriented in such a way to physically prevent the first receiver and the second receiver from receiving the first signal simultaneously except when the robot is aligned with the virtual line.

11. A system, comprising:
a device for detecting alignment of a robot with a virtual line, comprising:
at least one transmitter;
a first passage and a second passage; and
a first receiver and a second receiver positioned within the first passage and the second passage, respectively;
wherein the device is configured to:
receive a first signal with the first receiver and the second receiver;
detect that the robot is aligned with the virtual line when the first receiver and the second receiver simultaneously receive the first signal, wherein the virtual line is in line with and located at a midpoint between the first passage and the second passage; and
transmit a second signal indicating that the robot is aligned with the virtual line with the at least one transmitter; and
the robot, comprising:
at least one transmitter;
at least one receiver;
a processor; and
a tangible, non-transitory, machine-readable medium for storing instructions that when executed by the processor effectuates operations comprising:
transmitting, with the at least one transmitter, the first signal;
receiving, with the at least one receiver, the second signal indicating that the robot is aligned with the virtual line; and actuating, with the processor, the robot to execute a movement upon receiving the second signal.

12. The system of claim 11, wherein the operations of the robot further comprise:
determining, with the processor, a location of the robot based on a signal received by a transmitter of the robot from a receiver of the device.

13. The system of claim 11, wherein the movement comprises at least one of: reversing, moving forward, and turning.

14. The system of claim 11, wherein the operations of the robot further comprise:
actuating, with the processor, the robot to slow down upon receiving the second signal.

15. The system of claim 11, wherein the first receiver and the second receiver are configured to only receive the first signal during a designated time.

16. The system of claim 11, wherein the first signal is only transmitted during a designated time.

17. The system of claim 11, wherein the device is at least one of: self-powered and portable.

18. The system of claim 11, wherein the first passage and the second passage include a plurality of baffles positioned along their respective passage walls.

19. The system of claim 18, wherein the plurality of baffles of the first passage and the second passage are angled towards an opening of the respective passage.

20. The system of claim 11, wherein the first passage and the second passage are oriented in such a way to physically prevent the first receiver and the second receiver from receiving the first signal simultaneously except when the robot is aligned with the virtual line.

\* \* \* \* \*